Feb. 19, 1935. T. G. JONN ET AL 1,991,614
OIL CHECK FOR BEARINGS
Filed April 30, 1934
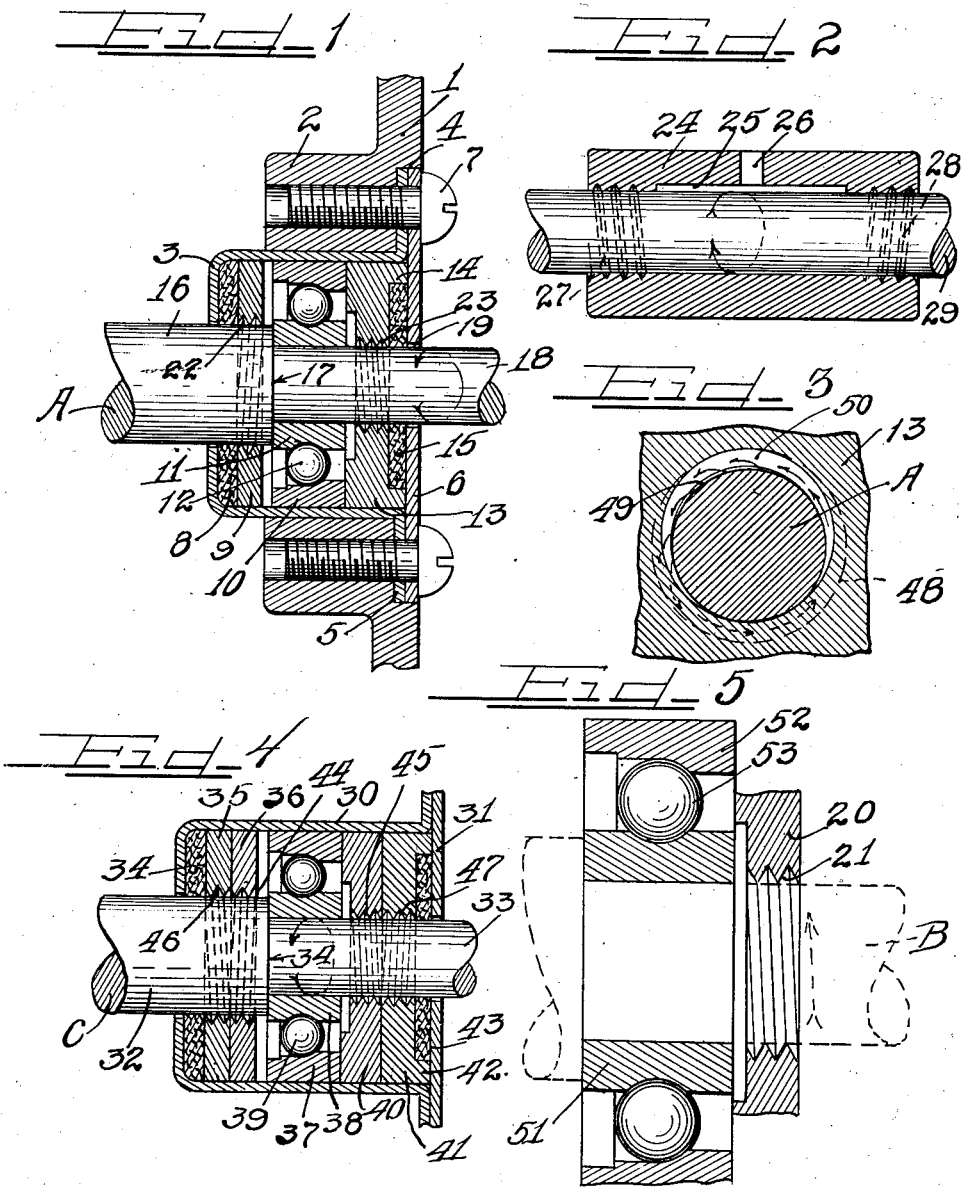

Patented Feb. 19, 1935

1,991,614

UNITED STATES PATENT OFFICE 1,991,614

OIL CHECK FOR BEARINGS

Tage G. Jonn and Adam A. Breuer, Chicago, Ill.

Application April 30, 1934, Serial No. 723,161

1 Claim. (Cl. 308—187)

The present invention relates to oil check for bearings, and more particularly to novel means applicable to shaft bearings to prevent creepage or seepage of lubricant along shafts in directions to escape from the bearings.

Experience has demonstrated that it is impossible to seal bearings against some oil escape, especially in such instances where the bearings are subjected to heat, as for example in electrical machinery, or in connection with high speed shaft rotations, where the heat generated thins the lubricant to points where it travels along the shafts, passing the usual shields, such as felt washers, or other packing material, and escapes to the outside of the bearings, requiring replenishment in the bearings, and constant attention to prevent dripping of the escaped lubricant.

An object of the present invention is to provide novel means for preventing lubricant escape from shaft bearings.

Another object of the invention is to provide novel means forming guideways to return lubricant to the bearings and prevent its escape by seepage.

A further object of the invention is to provide a novel gland structure applicable to shaft bearings to prevent oil travel, axially of shafts, away from the bearings for escapement by seepage.

The above, other and further objects of the invention, will be apparent from the following description, accompanying drawing, and appended claim.

The accompanying drawing illustrates various means, embodying principles of the present invention, for preventing oil escape from shaft bearings.

The views of the drawing are as follows:

Figure 1 is a fragmental sectional view through a portion of a motor casing, showing a ball bearing therein, for supporting a shaft, and provided with means constructed in accordance with the principles of the present invention for preventing lubricant escape.

Figure 2 is a sectional view through a line shaft bearing, showing applied thereto means constructed in accordance with the principles of the present invention for preventing oil escape.

Figure 3 is a transverse sectional view through a shaft, and a gland constructed in accordance with the principles of the present invention, indicating by arrows the outward hurling of the lubricant by centrifugal action due to shaft rotation, and also the circular motion imparted to the lubricant by shaft rotation.

Figure 4 is a sectional view of a ball bearing construction equipped with means for preventing oil escape, embodying principles of the present invention as applied to a reversible shaft.

Figure 5 is a sectional view through a ball bearing, provided with means constructed in accordance with the principles of the present invention for preventing lubricant escape from the bearing, and indicating the shaft in dotted lines.

The drawing will now be explained.

A fragmental portion of a motor casing 1 is illustrated in Figure 1 and is provided with the usual ball bearing boss 2 providing an opening for the casing 3 of the ball bearing structure. The face of the frame member 1 is recessed at 4 to receive the flange 5 of the ball bearing casing as well as a face plate 6 which is applied after the ball bearing case has been inserted in the frame 1. The case 3 and face plate 6 are retained in position in the frame 1 by means of bolts 7.

Within the bearing case 3 is an inner felt washer or other suitable gasket 8, against which is a gland 9 provided with certain novel features of the present invention. A ball bearing structure comprising an outer race 10 and inner race 11 between which are the usual balls 12. Another gland 13 provided with certain novel features of the present invention, is next inserted, which gland is illustrated as provided with a recessed pocket 14 to receive a felt washer or other suitable packing material 15.

A shaft, designated generally at A has a portion of enlarged diameter as at 16 which enters the bearing casing 3 through an aperture in the end wall and is surrounded by the inner felt washer or other packing material 8 and is reduced in diameter providing a shoulder 17 for endwise engagement against the inner ball race 11, with the reduced portion 18 of the shaft projecting through the flange 13 and packing material 15 and through an aperture 19 in the face plate 6. The engagement of the shoulder 17 against the inner ball race 11 serves as an end bearing for the shaft A.

The margins of the glands 9 and 13, about the shaft A, are provided with means for directing the lubricant within the bearing toward the bearing, as the shaft is rotated, thus preventing its escape by seepage. The means illustrated in the drawing, for accomplishing this purpose, appear as spiral or screw threads.

Figure 5 illustrates the details of the guideways more in detail. There a gland 20 is provided with screw threads 21 inclined with respect to the direction of rotation of the shaft B to urge the lubricant backwardly toward the bearing, indicated generally at C. In other words if the shaft has a left hand rotation, then the threads 21 will be left hand threads.

Figure 1 illustrates by an arrow the direction of rotation of the shaft A in the bearing. The guideways, in the gland 9, are shown as inclined to direct lubricant toward the ball bearings, while the guideways in the flange 13 illustrate the threads as being inclined in the opposite direction from those in the gland 9, also for the purpose of directing any lubricant, which tends to seep outwardly through the face plate 6, backwardly toward the ball bearings.

When a shaft rotates in its bearings, the rotation thereof tends to impart circulatory motion to the lubricant and cause it to rotate with the shaft, by reason of the adherence between the lubricant and the shaft. Also, because of the rotation of the shaft, the lubricant is hurled outwardly by centrifugal force. It is to be understood that the space between a shaft and its bearing is infinitesimal. However there is some space and it is in this space that the lubricant is given the circulatory motion and also the outward motion by centrifugal action.

Observing the arrangement in Figure 1, as the shaft A is rotated in the direction indicated by the arrow the lubricant within the bearing casing 3, and surrounding the portion of enlarged diameter 16, of the shaft A, will be hurled outwardly into the threads 22, and because of the inclination of these threads with respect to the direction of rotation of the shaft, the circulatory motion of the lubricant as caused by the rotation of the shaft, will move the lubricant within the threads or spaces 22 toward the ball bearings. In like manner, the rotation of the shaft A will hurl the lubricant about the shaft adjacent the flange 13, into the spaces 23 whereupon the lubricant, because of the inclination of these threads or spaces 23 with respect to the direction of shaft rotation, will be moved along the shaft toward the ball bearings.

Figure 2 illustrates application of the present invention to a line shaft wherein a line bearing is indicated generally at 24, where it is provided with the usual lubricant receiving space 25 and a filling opening 26. The end walls of the bearing 24 are provided with the inclined passages or spaces 27 and 28 inclined in such direction with respect to shaft rotation, as to direct the contained lubricant inwardly toward the lubricant receiving space 25 of the bearing. The arrow indicates the direction of rotation of the shaft 29 of this figure.

Sometimes shafts are arranged for reverse rotation. In order to prevent oil seepage from bearings of reversible shafts, the arrangement illustrated in Figure 4 may be employed. A ball bearing casing 30 is provided with a face plate 31. A shaft C has a portion 32 of enlarged diameter and another portion 33 of less diameter. A shoulder 34 is formed in the shaft at the junction of the portions of different diameters.

Within the bearing casing 30 and surrounding the portion 32 of larger diameter, is packing material 34 of suitable character. Next is a gland 35 and against this is a second gland 36. The margins of the glands 35 and 36 adjacent the shaft C are provided with the passages or recesses or spaces of the present invention which passages, in these particular glands, are inclined in opposite directions.

A ball bearing structure, comprising an outer race 37, inner race 38, and balls 39, is next inserted with the inner race 38 against the shoulder 34 of the shaft, to serve as an end bearing for the shaft. A gland 40 rests against the bearing within the casing 34, and against this gland is a second gland 41, provided with a counter bore 42 for receiving packing material 43, with the face plate 31 overlying the packing material 43 within the counter bore 42. The margins of the glands 40 and 41, adjacent the portion 33 of the shaft C are provided with the novel recesses or passages of the present invention.

One direction of rotation of the shaft C is indicated by the arrow in Figure 4. Assuming rotation of the shaft in the direction indicated by Figure 4, then, to return any lubricant that may seep along the shaft, from the interior of the bearing casing 34, the passages or guideways 44 and 45 in the glands 36 and 40 respectively are inclined in such directions as will direct the seepage lubricant toward the ball bearings. In the mentioned direction of rotation of the shaft C, the passages 44 and 45 of the glands 36 and 40 are inclined in the same directions as the passages in the glands 9 and 13 of the arrangement of Figure 1.

With the shaft C rotating in opposite direction, the passages in the glands 35 and 41 will be effective to prevent seepage of lubricant along the shaft for escapement outwardly of the casing 34. It will be observed that the passages or guideways 46 in the gland 35 are inclined in opposite directions to those in the gland 36. In like manner the passages or guideways 47 in the gland 41 are inclined oppositely to the inclination of the passages or guideways 45 in the gland 40.

It will be observed therefore that the present invention is readily applicable to bearings for shafts where the shafts rotate continuously in the same direction, and also to bearings for shafts where the shafts are given reverse movement from time to time.

Referring still to Figure 4, with the shaft C rotating in the direction indicated by the arrow, the tendency of lubricant to escape along the shaft, in both directions from the ball bearings, will be checked and returned to the bearings by reason of the passages or guideways in the glands 36 and 40.

With the rotation of the shaft in the opposite direction, the lubricant will move freely through the passages 44 and 45 in the glands 36 and 40, until meeting the passages 46 and 47 in the glands 35 and 41, whereupon the lubricant will be checked in its outward movement of seepage, and forced inwardly toward the ball bearings.

Figure 3 illustrates the action which takes place in a shaft bearing provided with a gland of the present invention.

The shaft A rotates in counter-clockwise direction as observed in this figure. The dotted line 48 represents the root circle of the roots of the passages or threads in the glands, such for instance as the gland 13. The circle 49 represents the crests of the threads of the spiral passages or guideways of the glands. It will be observed, from Figure 3, that a slight space appears between the crest circle 49 and the upper portion of the shaft A. This space is exaggerated for the purpose of clearness, in connection with the explanation of the present invention. The arrows 50 represent the manner in which the lubricant is hurled outwardly by centrifugal action due to shaft rotation, and also to the movement thereof along the passages in the gland, by reason of the circulatory motion imparted to the lubricant by shaft rotation. Such circulatory motion imparted to the lubricant causes that lubricant within the passageways or threads to travel along the passages and threads, and because of the inclination of such passages, the lubricant is directed inwardly of the bearing that is toward the ball bearing, and prevented from escapement by seepage.

The arrows 50 of Figure 3 show the direction of travel of the lubricant within the guideways or threads of the gland 13 as caused by rotation of the shaft A in counter-clockwise direction as viewed in this figure.

Figure 5 shows a ball bearing having an inner race 51, an outer race 52 and balls 53. Rotation of the shaft B in the direction indicated by the arrow will hurl the lubricant into the guideways or spaces 21 and cause circulatory motion of the lubricant within these spaces. Because of the inclination of these spaces in the manner illustrated, the lubricant will be urged toward the bearing and thus prevented from escape by seepage along the shaft.

In the practical application of the present invention to bearings, such for instance where the shaft has different diameters, as illustrated in Figures 1, 4, and 5, because of the difference in centrifugal action resulting from the different diameters, the widths of the glands 9 and 13 will be different, with the width of the gland 9 less than that of the gland 13. This might be taken care of by changing the inclination of the threads in the gland 9 to lie at less of an angle to the shaft axis than the threads in the gland 13.

It will be observed in Figure 2, that the lubricant pocket 25, stops short of the threads or passages 27, which is to prevent leakage of lubricant from the bearing when the shaft is at rest.

When a gland or washer is applied to a bearing in the manner illustrated in Figure 5, the threads or recesses 21 will be terminated inwardly of the outer face of such gland, to prevent picking up of dirt by the pump action which is created by the circulatory motion imparted to the lubricant by shaft rotation and to the axial movement of such lubricant by reason of the provision of the threads or recesses 21.

The action created in the present invention, is a pumping action. It is well known that in a shaft bearing, a film of lubricant surrounds the shaft. As the shaft is rotated this film travels with the shaft, that is has circulatory motion with the shaft, and by reason of centrifugal action is hurled outwardly within the space between the shaft and its bearing surfaces. It is the combination of this rotary or circulatory motion imparted to the lubricant and to the outward movement thereof under centrifugal action, that enables the pumping action of the lubricant toward the bearings and away from the outer faces or sides of the bearing members, to prevent escapement by seepage.

The crest circles of the various threaded glands or washers, are spaced from the shaft infinitesimal distances to provide clearance. This space however is not sufficient to prevent the pumping action described.

The invention has been described herein more or less precisely as to the details, yet it is to be understood that the invention is not to be limited thereby, as changes may be made in the arrangement and proportion of parts, and equivalents may be substituted, without departing from the spirit and scope of the invention.

The invention is claimed as follows:

A shaft bearing construction, including in combination, a bearing casing having one open end to receive packing and gland materials and having its other end apertured to surround a shaft, an apertured cover plate for said open end, compressible packing material within said casing and against said other end, a metallic gland against said packing and having a helical groove in its gland face, anti-friction members surrounding the shaft adjacent said gland, a similar gland on the opposite side of said anti-friction members from said first mentioned gland, and compressible packing material between said second mentioned gland and the cover plate.

TAGE G. JONN.
ADAM A. BREUER.